(No Model.)

H. P. HERRON.
TOBOGGAN.

No. 571,665. Patented Nov. 17, 1896.

WITNESSES:
Paul Johel
J. Fred Acker

INVENTOR
H. P. Herron
BY
Munn & Co.
ATTORNEYS.

UNITED STATES PATENT OFFICE.

HARRY PALMER HERRON, OF LOS ANGELES, CALIFORNIA, ASSIGNOR OF ONE-HALF TO FRED HERRON, OF WORTHINGTON, MINNESOTA.

TOBOGGAN.

SPECIFICATION forming part of Letters Patent No. 571,665, dated November 17, 1896.

Application filed October 19, 1895. Serial No. 566,205. (No model.)

*To all whom it may concern:*

Be it known that I, HARRY PALMER HERRON, of Los Angeles, in the county of Los Angeles and State of California, have invented a new and Improved Toboggan, of which the following is a full, clear, and exact description.

My invention relates to an improvement in toboggans or coasters; and the object of the invention is to provide a toboggan with a roller or wheeled support, and, further, to provide roller-bearings for the trunnions of the wheels or rollers and also for the steering-gear; and a further object of the invention is to provide a steering-gear for the forward portion of the toboggan, and to so construct said gear that it may be locked and the toboggan steered by the foot of the operator from the rear.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
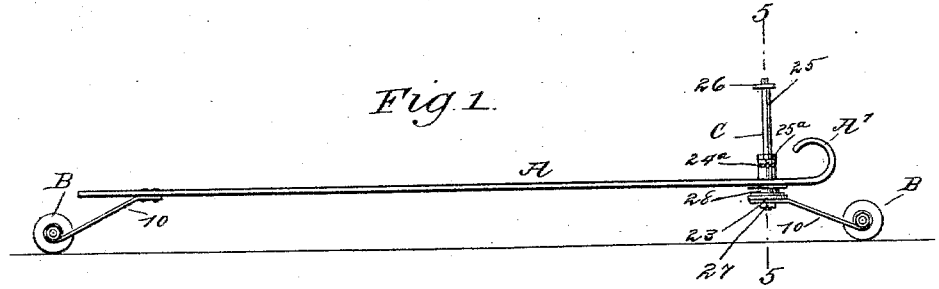
Figure 2:
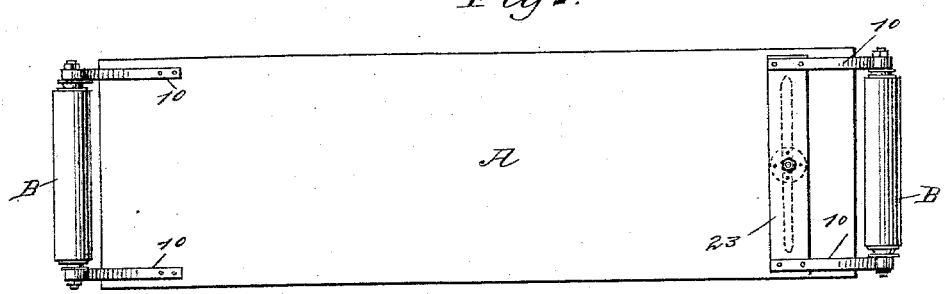
Figure 3:
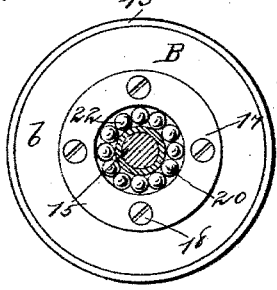
Figure 4:
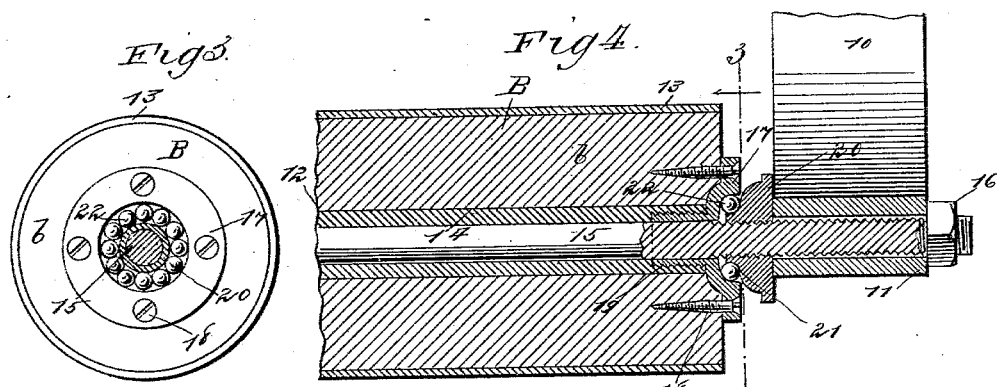
Figure 6:
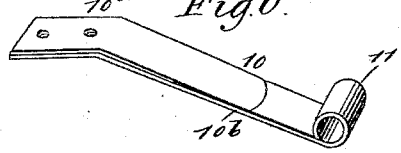
Figure 5:
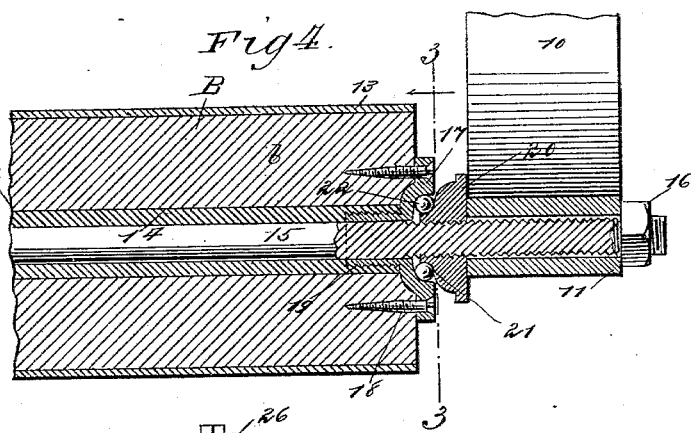

Figure 1 is a side elevation of the improved toboggan. Fig. 2 is a bottom plan view of the same. Fig. 3 is a section taken practically on the line 3 3 of Fig. 4. Fig. 4 is a longitudinal section through one end of one of the roller-supports for the toboggan, illustrating the roller-bearings therefor. Fig. 5 is a vertical section through the steering-gear, the said section being taken on the line 5 5 of Fig. 1; and Fig. 6 is a perspective view of one of the spring-arms adapted as supports for the ends of the shafts upon which the roller-bearings turn.

In carrying out the invention, the body A of the toboggan may be made of any desired material and may be of any size, the forward end A' of the body being preferably turned upward and curved over said body, as shown in Fig. 1.

At the rear of the toboggan, upon the under face thereof, a two-leaved or jack spring 10 secured. The two springs constitute virtually a single arm, and the upper or inner end of the spring is flat, as shown at $10^a$ in Fig. 6, while the bottom portion of the spring is carried downward at an angle to the flat surface, the inclined or body portion of the said spring-arm being designated as $10^b$; and at the lower portion of the body of each spring-arm an eye or a sleeve 11 is formed, preferably upon the upper surface of the body, as is likewise shown in Fig. 6. These spring-arms, through the medium of their flattened portions $10^a$, are bolted, screwed, or otherwise fastened to the rear end portion of the toboggan, and the said rear spring-arms are adapted to carry a roller B, a wheel, or the equivalent thereof. Usually, however, a roller is employed, and it is constructed as shown in detail in Figs. 3 and 4, in which it will be observed that the body portion $b$ of the roller is provided with a central longitudinal opening 12, and this body portion is usually made of wood and is surrounded or incased in a metal cylinder 13. A tube 14 is firmly secured in the longitudinal opening of the roller, and a shaft 15 is passed through this tube and extends beyond each end of the roller, the outer end portions of the shaft being exteriorly threaded, and these threaded end portions are passed through the eyes 11 in the rear spring-arms 10, and the shaft is held rigid by placing lock-nuts 16 or their equivalents upon the outer extremities of the shaft and carrying them to a bearing against the outer side faces of the arms, as shown in Fig. 4.

The roller turns around the shaft, and the inner tube 14 turns with the body of the roller, and in order that friction may be reduced to a minimum ball-bearings are provided for the roller, one at each of its ends, and preferably the said bearings consist of cup-shaped castings 17, which are secured to the ends of the roller by screws 18 or their equivalents, and each cup-casting is also preferably provided with an exteriorly-threaded sleeve or collar 19, adapted to be screwed into an end portion of the roller-tube 14, the shaft 15 passing through the cup-casting as well as its collar. A bearing-block 20 is then screwed upon the threaded portion of the shaft between the spring-arm and the cup-casting 17, the said bearing-block being provided with an annular concaved surface 21, facing the dished portion of the casting 18, and balls 22 are held to travel upon the concaved surface 21 of the block and in contact with the dished or concaved surface of the casting.

At the front of the toboggan spring-arms 10, similar to those above described, are secured rigidly, one to the under face of each end portion of a cross-bar 23, and a second roller B is carried by the outer ends of these forward arms.

A steering apparatus or device C is connected with the aforesaid cross-bar 23, and the construction is preferably as shown in Fig. 5, in which a cup-casting 24, similar to the casting 17, heretofore described, is secured upon the bottom portion of the body of the toboggan, and the casting 24 is provided with a sleeve 24$^a$, which extends through the body of the toboggan and preferably a distance above its upper face. A steering-shaft 25 is passed downward through the casting 24 and its sleeve 24$^a$, and at the outer end of the said shaft a steering-bar 26 or its equivalent is secured, while the lower end of the steering-shaft is threaded and is passed through the cross-bar 23 and held in engagement therewith by a lock-nut 27, and this threaded portion of the shaft likewise passes through a bearing-block 28, being of practically the same construction as the bearing-block 20 of the rollers B, except that the bearing-block 28 is secured upon the upper face of the cross-bar, and the balls 29 are held to travel between the bearing-block 28 and the casting 24. Thus it will be observed that the forward roller may be carried in direction of either side of the toboggan for the purpose of directing its course; but when it is desired to steer the toboggan with the foot and from the rear the forward roller will be brought parallel with the rear one, and the steering-shaft will be held against turning by passing a set-screw 30 through the collar of the cup-casting 24, as shown in Fig. 5, to an engagement with the said shaft. As heretofore stated, a wheel or any equivalent thereof may be substituted for the rollers B. The steering-shaft 25 is provided with a collar or shoulder 25$^a$, which rests upon the top of the sleeve 24$^a$, thereby keeping the bearing-block 28 from falling away from the casting 24. The collar 25$^a$ also serves to exclude dust from the ball-bearings.

Having thus described my invention, I claim as new and desire to secure by Letters Patent—

1. In a toboggan or coaster, a platform or body adapted to receive a person, arms attached to the platform or body at the rear and extending downwardly therefrom, a roller or wheel journaled in the said arms, duplicate arms and a roller located at the forward portion of the body, the said forward arms being connected, a steering device attached to the connecting medium of the forward arms, and a lock whereby the steering device may be held rigid and the forward arms prevented from turning, as and for the purpose specified.

2. In a toboggan or coaster, a body or platform upon which the person is to rest, spring-arms connected with the body at its ends and extending downwardly therefrom, and rollers carried by the said spring-arms, the said rollers being provided with ball-bearings, as and for the purpose specified.

3. In a toboggan or coaster, a body or platform, spring-arms connected with the said body or platform at its ends, the arms being downwardly inclined, the forward arms being connected and the rear arms secured directly to the platform, rollers journaled in the two sets of arms, the said rollers being provided with ball-bearings, a steering-shaft attached to the connecting medium of the forward set of arms, ball-bearings for the said shaft, and a locking device whereby the said shaft may be held stationary, as and for the purpose set forth.

4. In a toboggan or coaster, the combination, with the body or platform adapted to sustain a person, of spring-arms connected with the body and extending downwardly therefrom, a shaft secured in the said arms, a roller mounted to turn on the said shaft, and ball-bearings carried partially by the roller and partially by the shaft, as and for the purpose specified.

5. A toboggan, comprising a body, two spring-arms projecting from each end of the body, the arms being extended downwardly and with angular relation to the body, and a roller journaled in each pair of arms, substantially as described.

6. In a toboggan, the combination of a body portion, a spring-arm secured to the body portion and projecting downwardly therefrom, and a roller carried by the arm, substantially as described.

HARRY PALMER HERRON.

Witnesses:
MARY LORICKE,
GIRTHA HERRON.